United States Patent [19]
Gaalema et al.

[11] Patent Number: 5,694,147
[45] Date of Patent: Dec. 2, 1997

[54] LIQUID CRYSTAL INTEGRATED CIRCUIT DISPLAY INCLUDING AS ARRANGEMENT FOR MAINTAINING THE LIQUID CRYSTAL AT A CONTROLLED TEMPERATURE

[75] Inventors: Stephen D. Gaalema, Colorado Springs; Mark A. Handschy, Boulder, both of Colo.

[73] Assignee: Displaytech, Inc., Boulder, Colo.

[21] Appl. No.: 421,899

[22] Filed: Apr. 14, 1995

[51] Int. Cl.$^6$ .................................................. G09G 3/36
[52] U.S. Cl. .......................... 345/101; 345/87; 349/42; 349/72
[58] Field of Search ................ 345/87, 101; 359/86; 323/366; 349/42, 43, 72

[56] References Cited

U.S. PATENT DOCUMENTS

| | | | |
|---|---|---|---|
| 3,943,434 | 3/1976 | Haeusler et al. | 323/366 |
| 4,206,501 | 6/1980 | Brooks | 359/86 |
| 4,634,225 | 1/1987 | Haim et al. | 359/86 |
| 4,723,835 | 2/1988 | Franklin | 359/86 |
| 4,775,221 | 10/1988 | Baumgartner, Jr. | 359/86 |
| 4,987,289 | 1/1991 | Bishop et al. | 359/86 |
| 5,027,111 | 6/1991 | Davis et al. | 345/101 |
| 5,029,982 | 7/1991 | Nash | 345/101 |
| 5,088,806 | 2/1992 | McCartney et al. | 345/101 |
| 5,119,215 | 6/1992 | Marks et al. | 359/86 |
| 5,164,849 | 11/1992 | Evans et al. | 359/86 |
| 5,299,038 | 3/1994 | Hamada et al. | 359/86 |

FOREIGN PATENT DOCUMENTS 4137260 5/1993 Germany .................. 345/101

*Primary Examiner*—Richard Hjerpe
*Assistant Examiner*—Kent Chang
*Attorney, Agent, or Firm*—Stephen C. Shear

[57] ABSTRACT

An active matrix liquid crystal display includes an arrangement for maintaining the liquid crystal material of the display at a controlled temperature above ambient temperature. The liquid crystal material of the display is disposed over a substrate containing integrated circuitry. The arrangement for maintaining the temperature of the liquid crystal includes (i) an arrangement for heating the liquid crystal material sufficient to maintain the liquid crystal material at the controlled temperature, (ii) an arrangement for sensing the temperature at a location in close proximity to the liquid crystal material and producing an output signal representative of the temperature, and (iii) a servo-circuit responsive to the output signal for causing the heating arrangement to maintain the liquid crystal material at the controlled temperature. In accordance with the present invention, at least some of the elements making up the arrangement for heating the liquid crystal, the arrangement for sensing the temperature, or the servo-circuitry are formed as part of the integrated circuitry contained within the substrate which the liquid crystal is disposed over. In one preferred embodiment of the present invention, all of the elements making up the arrangement for heating the liquid crystal, the arrangement for sensing the temperature, and the servo-circuitry are formed as part of the integrated circuitry contained within the substrate which the liquid crystal is disposed over.

29 Claims, 3 Drawing Sheets

5,694,147

LIQUID CRYSTAL INTEGRATED CIRCUIT DISPLAY INCLUDING AS ARRANGEMENT FOR MAINTAINING THE LIQUID CRYSTAL AT A CONTROLLED TEMPERATURE

GOVERNMENT CONTRACT CLAUSE

This invention was made with Government support under contract 70NANB1H1113 awarded by the United States Department of Commerce. The Government has certain rights in this invention.

BACKGROUND OF THE INVENTION

The present invention relates generally to an active matrix liquid crystal display including a layer of liquid crystal material disposed over a substrate containing integrated circuitry, and more particularly to an arrangement for maintaining the liquid crystal material of the display at a controlled temperature above ambient temperature.

In the field of active matrix liquid crystal displays it is well known that the performance of the liquid crystal material as a light modulating medium varies dramatically with the temperature of the liquid crystal. In fact, if the liquid crystal material is allowed to get cold enough, it will 'freeze', or change state, completely eliminating the light modulating characteristics of the liquid crystal material. It is also well known in the an that the speed at which the liquid crystal changes light modulating states is directly effected by the temperature of the liquid crystal. As the temperature increases, the speed at which the liquid crystal material changes light modulating states also increases so long as the liquid crystal material remains within the temperature range in which the liquid crystal exhibits the desired light modulating characteristics.

Because of this relationship between temperature and the liquid crystal material being used as a light modulating medium of a display, at least one prior art arrangement has been developed for controlling the temperature of the liquid crystal material. In accordance with this prior art approach, a layer of transparent heating material is attached to the external face of the display. This heating material is controlled by a temperature sensor and servo which are external to the liquid crystal display which controllably cause the heating material to transfer heat through the face of the display to the liquid crystal material. Although this approach is functional, it is relatively inefficient and expensive. The present invention provides an active matrix liquid crystal display including a layer of liquid crystal material disposed over a substrate containing integrated circuitry. The display includes an arrangement for maintaining the liquid crystal material of the display at a controlled temperature above ambient temperature with at least some of the elements making up the arrangement formed as part of the integrated circuitry.

SUMMARY OF THE INVENTION

As will be described in more detail hereinafter, an arrangement for maintaining the liquid crystal material of an active matrix liquid crystal display at a controlled temperature above ambient temperature is disclosed. The active matrix display includes a layer of liquid crystal material disposed over a substrate containing integrated circuitry. The arrangement for maintaining the temperature of the liquid crystal includes (i) means for heating the liquid crystal material sufficient to maintain the liquid crystal material at the controlled temperature, (ii) means for sensing the temperature at a location in close proximity to the liquid crystal material and producing an output signal representative of the temperature, and (iii) a servo-circuit responsive to the output signal for causing the heating means to maintain the liquid crystal material at the controlled temperature. In accordance with the present invention, at least some of the elements making up the means for heating the liquid crystal, the means for sensing the temperature, or the servo-circuitry are formed as part of the integrated circuitry contained within the substrate which the liquid crystal is disposed over. In one preferred embodiment of the present invention, all of the elements making up the means for heating the liquid crystal, the means for sensing the temperature, and the servo-circuitry are formed as part of the integrated circuitry contained within the substrate which the liquid crystal is disposed over.

In one particular version of the above mentioned preferred embodiment, the means for heating the liquid crystal material includes a pattern of polysilicon material formed on the substrate serving as a heating element. The heating means also includes a transistor for regulating the amount of power dissipated as heat. In this particular embodiment, the transistor is formed entirely within the substrate below the pattern of polysilicon serving as the heating element and the transistor is also larger than would ordinarily required from an electrical standpoint. This larger transistor distributes the heat generated by the transistor more evenly within the substrate than would otherwise be the case if the transistor were smaller.

In a particular version of the means for sensing the temperature in the above mentioned preferred embodiment, the means for sensing the temperature includes (i) circuitry forming a Wheatstone bridge including first and second parallel pairs of first and second series connected resistors and (ii) means for applying a voltage across the Wheatstone bridge. In a particular version of the Wheatstone bridge, the first resistor of the first pair of resistors and the second resistor of the second pair of resistors are substantially temperature-independent resistors having substantially equal resistances which remain relatively constant over a range of temperatures. The second resistor of the first pair of resistors and the first resistor of the second pair of resistors are temperature-dependent resistors whose resistance varies with changes in temperature to a much greater extent than the temperature-independent resistors. In this version, the temperature-independent resistors are polysilicon resistors and the temperature-dependent resistors are formed as moderately doped regions in the substrate such as would be formed in the making of wells in a typical CMOS process.

In a particular version of the servo-circuit, the servo-circuit includes a differential amplifier having two input terminals and an output terminal for producing the output signal. A first of the input terminals is electrically connected to the first pair of resistors between the first and second resistor making up the first pair of resistors. The second of the input terminals is electrically connected to the second pair of resistors between the first and second resistor making up the second pair of resistors. And, the output terminal is electrically connected to the transistor of the means for heating the liquid crystal material. In this particular version of the servo-circuit, one of the input terminals of the differential amplifier is adapted to be electrically connected to elements external to the integrated circuit chip for purposes of controllably adjusting the current applied to the one of the input nodes of the differential amplifier, so as to adjust the temperature being controlled. The output terminal of the differential amplifier is adapted to be electrically connected to elements external to the integrated circuit chip for purposes of providing a stabilizing feedback signal to the one of the input terminals of the differential amplifier.

BRIEF DESCRIPTION OF THE DRAWINGS

The features of the present invention may best be understood by reference to the following description of the presently preferred embodiments together with the accompanying drawings in which.

DETAILED DESCRIPTION

Figure 1:
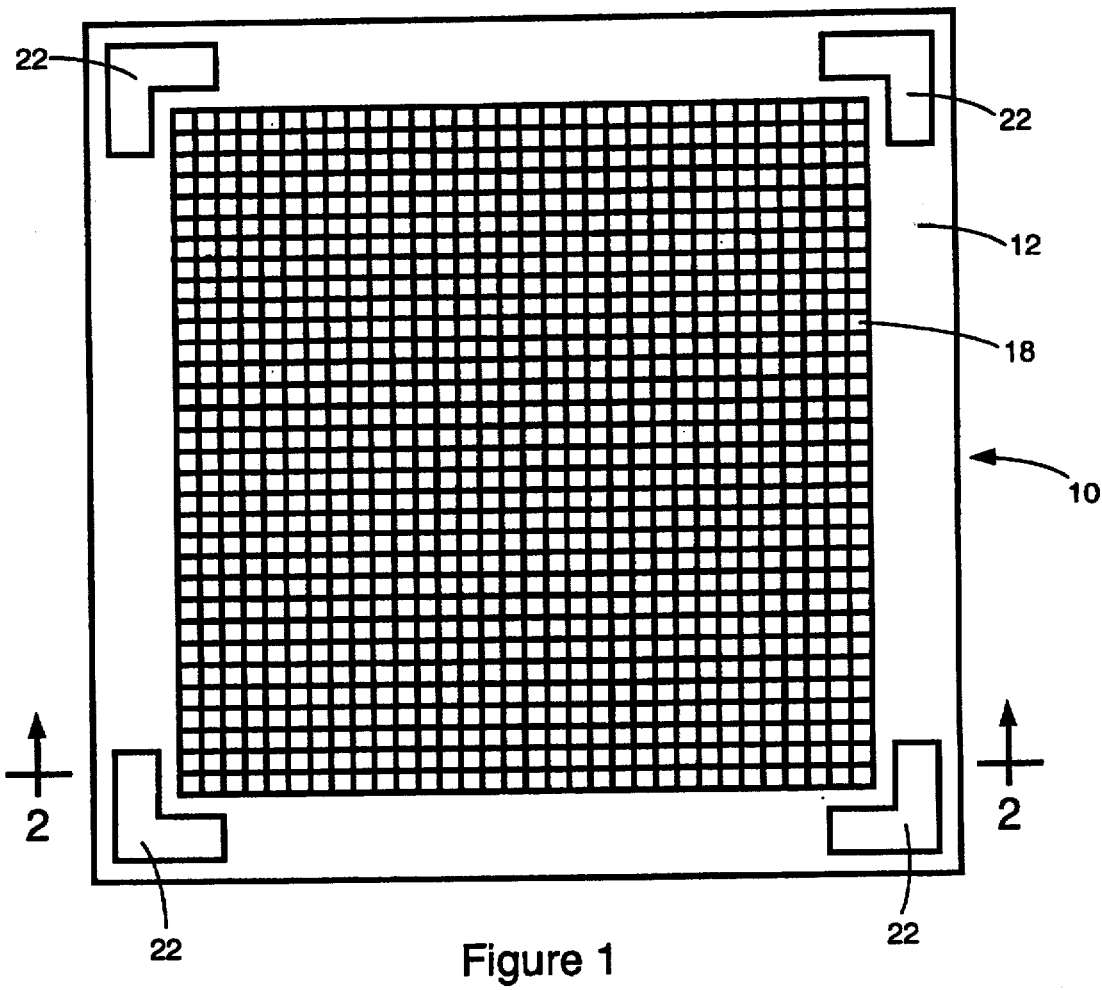
FIG. 1 is a diagrammatic plan view of an integrated circuit active matrix liquid crystal display assembly in accordance with the present invention including an arrangement for maintaining the liquid crystal material at a controlled temperature.
Figure 2:
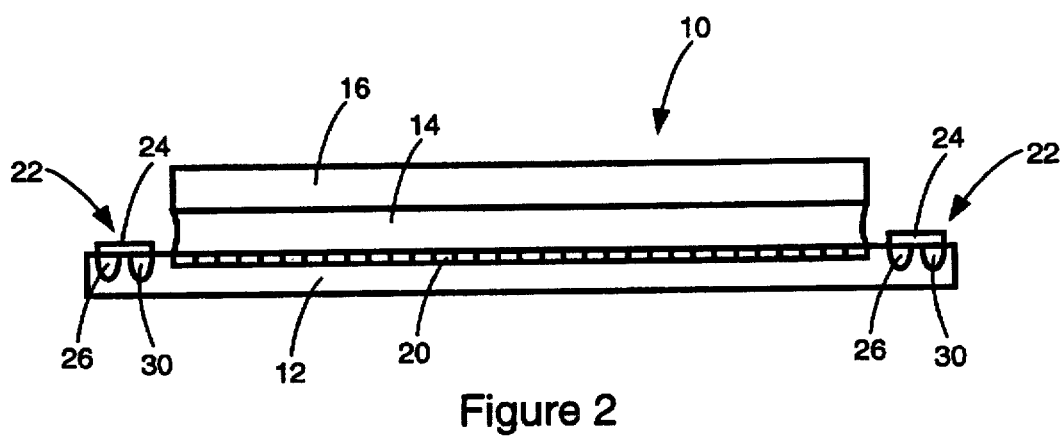
FIG. 2 is a diagrammatic cross sectional view of the integrated circuit assembly of FIG. 1 taken generally along lines 2—2 in FIG. 1.
Figure 3:
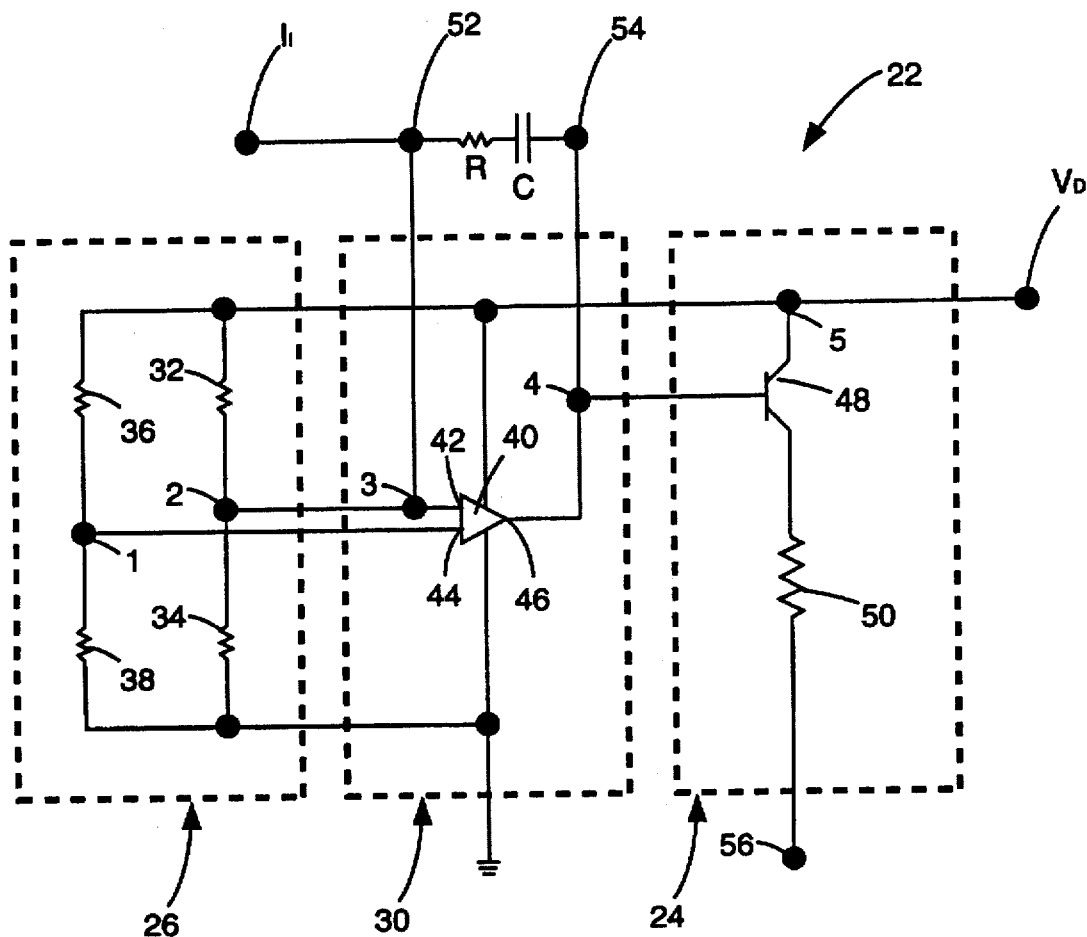
FIG. 3 is a schematic representation of one preferred embodiment of the integrated circuitry making up the arrangement for maintaining the liquid crystal material at a controlled temperature.

Referring initially to FIGS. 1–3 in which like components are indicated by like reference numerals, a preferred embodiment of an integrated circuit active matrix liquid crystal display assembly designed in accordance with the present invention will be described. As shown in FIGS. 1 and 2, the integrated circuit display assembly, generally designated by reference numeral 10, includes a silicon substrate 12 having a plurality of integrated circuit elements formed into or upon substrate 12. Assembly 10 also includes a layer of liquid crystal material 14 disposed over the central portion of substrate 12 and a display window 16 positioned above liquid crystal layer 14. Display window 16 is attached around its perimeter to substrate 12 thereby holding liquid crystal layer 14 in position on top of substrate 12. In the embodiment shown, liquid crystal layer 14 is a ferroelectric liquid crystal material which is divided into an array of individual light modulating pixels, indicated by reference numeral 18, by integrated circuitry 20 formed into or on top of substrate 12 immediately below liquid crystal layer 14. A detailed description of one such integrated circuit active matrix liquid crystal display is provided in copending U.S. patent application Ser. No. 08-362,665 filed Dec. 22, 1995, entitled AN ACTIVE MATRIX LIQUID CRYSTAL IMAGE GENERATOR, attorney docket number DIS1P003. Active matrix liquid crystal displays generally are well known in the art. Therefore, the components thus far recited will not be described in detail herein.

Although the liquid crystal material has been described above as being a ferroelectric liquid crystal material, this is not a requirement of the present invention. It should be understood that nematic liquid crystal materials and other liquid crystal materials also fall within the spirit and scope of the present invention. Also, although only one specific embodiment of a liquid crystal display assembly is described, it should be understood that the present invention equally applies to other liquid crystal display embodiments including a liquid crystal material disposed over a substrate containing integrated circuitry for controlling the light modulating state of the liquid crystal material.

Still referring to FIGS. 1 and 2 and in accordance with the present invention, integrated circuit display assembly 10 further includes an arrangement 22 for maintaining the liquid crystal material 14 at a controlled temperature above ambient temperature. As will be described in more detail hereinafter, arrangement 22 includes (i) a heating arrangement 24 for heating the liquid crystal material, (ii) a sensing arrangement 26 for sensing the temperature at a location in close proximity to the liquid crystal material and producing an output signal 28 (not shown in FIGS. 1 and 2) representative of the temperature, and (iii) a servo-circuit 30 responsive to output signal 28 for causing heating arrangement 24 to maintain liquid crystal material 14 at a controlled temperature above ambient temperature. In accordance with the present invention, at least some of the elements making up heating arrangement 24, sensing arrangement 26, and servo-circuit 30 are formed into or on top of substrate 12 as part of integrated circuit display assembly 10. In fact, in the embodiment illustrated in FIGS. 1 and 2, all of the elements making up arrangements 24 and 26 and servo-circuit 30 are formed into or on top of substrate 12 as part of integrated circuit display assembly 10.

In the embodiment illustrated, four arrangements 22 for maintaining the liquid crystal material at a controlled temperature above ambient temperature are included in integrated circuit display assembly 10. However, it should be understood that this number of arrangements is not a requirement of the present invention, but instead, the number of these arrangements may vary depending on the requirements of the application in which the assembly is to be used. Each of these arrangements are constructed in a similar manner and therefore, only one will be described in detail.

Referring to FIG. 3, one preferred embodiment of the present invention will be described in detail. FIG. 3 is a electrical circuit schematic diagram of one of the arrangements 22 shown in FIGS. 1 and 2 with the elements of the circuit being formed into or on top of substrate 12. As shown in FIG. 3, arrangement 22 includes heating arrangement 24, sensing arrangement 26, and servo-circuit 30 as mentioned above. In this embodiment, sensor arrangement 26 includes circuitry forming a Wheatstone bridge having a first and a second parallel pair of a first and a second series connected resistors indicated by resistors 32 and 34 corresponding to the first parallel pair of series connected resistors and resistors 36 and 38 corresponding to the second parallel pair of series connected resistors. Sensing arrangement 26 also includes an arrangement for applying a voltage, indicated by $V_D$, across the Wheatstone bridge such that the voltage applied across series connected resistors 32 and 34 is the same as the voltage applied across series connected resistors 36 and 38.

In this example, resistors 32 and 38 are polysilicon resistors which are formed such that they have substantially equal resistances, for example approximately 14K$\Omega$. Resistors 34 and 36 are formed from moderately doped regions in the silicon substrate 12, such as would be formed in the making of "wells" in a typical CMOS process. These regions, or well resistors, are designed to have substantially equal resistance values which are determined by the following considerations. The resistance of polysilicon resistors 32 and 38 typically rise slightly with increasing temperature, as does the resistances of the well resistors 34 and 36. In this example, typical values for the rise in resistance are 0.5% per degree C. for the well resistors, while the polysilicon resistors have coefficients about an order of magnitude smaller. With this arrangement, the common resistance value of resistor-pair 34 and 36 changes more than the common resistance value of resistor-pair 32 and 38 as their mutual temperature changes. In general, for this embodiment, all that is required for these resistors is that the pairs of resistors have different temperature coefficients of resistance. Thus, while in fact all of the resistors change resistance value with temperature, the important relative behavior of the resistor pairs is summarized by saying that resistors 32 and 38 have a resistance which is substantially temperature independent, while resistors 34 and 36 have a resistance which is temperature dependent. In accordance with the present invention, the nominal resistance values of resistors 34 and 36 are chosen by their detailed design so that each of the four resistors have substantially the same resistance value at a preselected temperature, for example 40° C. With this arrangement, for temperatures below the preselected temperature, the resistance value of resistors 34 and 36 will be higher than the resistance value of resistors 32 and 38, while for temperatures above the preselected temperature, the resistance value of resistors 34 and 36 will be below the resistance value of resistors 32 and 38.

Although the resistors making up the Wheatstone bridge have been described as being polysilicon resistors with a particular resistance and resistors formed as wells in substrate 12, this is not a requirement of the present invention, although it is preferred. Alternatively, these resistors may be provided in the form of any conventionally available resistor with any particularly selected resistance so long as not all of the resistors have the same temperature coefficient. Also, although the resistors described above are formed into or on the substrate, some or all of these resistors may be provided as discrete resistors which are appropriately electrically connected to the sensing arrangement. Moreover, in the preferred embodiment, the resistors (as well as the other components of arrangement 22), when formed in the substrate, are so formed and interconnected together in the manner shown in accordance with standard semiconductor processes and hence this method of formation will not be described herein.

Still referring to FIG. 3, servo-circuit 30 includes a differential amplifier 40 having two input terminals, 42 and 44, and an output terminal 46. The first input terminal 42 is electrically connected to the first pair of resistors 32 and 34 between resistor 32 and resistor 34 at node 1. The second input terminal 44 of differential amplifier 40 is electrically connected to resistors 36 and 38 between resistors 36 and 38 at node 2. And, output terminal 46 is electrically connected to heating arrangement 24. Again, as described above for the resistors making up the Wheatstone bridge, servo-circuit 30 may be formed into substrate 12 as part of the integrated circuitry included within substrate 12. Alternatively, the differential amplifier may be provided as a discrete component which is appropriately electrically connected to the other elements of the servo-circuit.

With the above described sensing arrangement 26 and servo-circuit 30, when voltage $V_D$ is applied to sensing arrangement 26, the Wheatstone bridge formed by resistors 32, 34, 36, and 38 causes the voltages at nodes 1 and 2 to vary depending on the resistances of temperature-dependent resistors 34 and 36. Therefore, the voltages at nodes 1 and 2 vary depending on the temperature. When the temperature reaches a certain preselected level as described above, in this example 40° C., temperature-dependent resistors 34 and 36 have a resistance which is substantially equal to the resistance of resistors 32 and 38. With the resistances of all four of the resistors substantially equal, the voltages at nodes 1 and 2 are substantially equal. Since input terminals 42 and 44 of differential amplifier 40 are electrically connected to nodes 1 and 2 respectively. amplifier 40 sees no differential between its input voltages and therefore there is no voltage difference to amplify and differential amplifier 40 has no output. However, as the temperature decreases below the preselected temperature (in this case 40° C.), the resistance of temperature-dependent resistors 34 and 36 increases. This increase in resistance of resistors 34 and 36 causes the voltage at node 1, and therefore input terminal 44 of differential amplifier 40, to be reduced and the voltage at node 2, and therefore input terminal 42 of differential amplifier 40, to increase. As these voltages at nodes 1 and 2 diverge, differential amplifier 40 sees an increasing difference in its input voltages and therefore produces an output that is proportional to the difference in the voltages at nodes 1 and 2. This output from differential amplifier 40 is used to control heating arrangement 24 which is used to heat liquid crystal material 14 disposed over integrated circuit substrate 12.

If the temperature increases above the preselected temperature (in this case 40° C.), the voltage at terminal 44 of differential amplifier 40 is increased and the voltage at terminal 42 of differential amplifier 40 is decreased. In this situation, differential amplifier 40 is arranged to produce no output signal, and therefore, heating arrangement 24 is not turned on. For both temperatures above the preselected temperature and for those below the preselected temperature, the feedback for the control servo is the thermal connection between the heater and the sensor through the integrated circuit substrate.

As shown in FIG. 3, heating arrangement 24 of this embodiment includes a transistor 48 and a heating element 50. Transistor 48 is electrically connected to the output terminal of differential amplifier 40 such that differential amplifier 40 controls the amount of current drawn from a source of electrical power through transistor 48 and heating element 50, in this case the source of electrical power is represented by $V_D$ applied at node 5. In this embodiment, transistor 48 is larger than is otherwise necessary for operating the heating arrangement in the manner described from an electrical standpoint. Using this oversized transistor, the heat generated by transistor 48 is more evenly distributed within substrate 12 than would otherwise be the case if a smaller transistor were used. This heat from transistor 48 contributes to maintaining the liquid crystal material at a controlled temperature and is only created when sensing arrangement 26 senses the temperature is below the preselected temperature. The overall servo gain of the system is selected by design to ensure that the equilibrium temperature of the overall arrangement during its operation closely approaches the preselected temperature.

In the embodiment being described, heater element 50 is a pattern of polysilicon material formed on top of substrate 12. The resistance of heater 50 is chosen so as to dissipate an appropriate amount of electrical power when driven by transistor 48 with an available electrical power supply. For example, a heater resistance of 40Ω is suitable for use with a five Volt supply which is commonly employed for integrated circuits. In this embodiment, heater element 50 is furthermore located in close proximity to sensing arrangement 26. Thus, sensing arrangement 26 is able to quickly respond to changes of temperature in and around heating element 50. This arrangement results in heating element 50 being maintained at a substantially constant temperature which substantially corresponds to the preselected temperature described above, in this example 40° C. Therefore, since heating element 50 is maintained at approximately 40° C.

and since heating element 50 is formed on top of and in direct contact with substrate 12 which is in direct contact with liquid crystal material 14, substrate 12 and liquid crystal 14 are also maintained at a controlled temperature which is approximately equal to the preselected temperature of 40° C. for this example.

As mentioned above for the components of sensing arrangement 26 and servo-circuit 30, the individual elements of heating arrangement 24 may be provided in the form of elements formed into or on top of substrate 12 or as discrete elements appropriately electrically connected to heating arrangement 24. Also, it should be understood that although the heating element has been described as being a pattern of polysilicon material formed on top of the substrate, the heating element may be provided in a wide variety of other conventional heating element forms including discrete heating elements appropriately electrically connected to heating arrangement 24.

Again, as mentioned above, the embodiment being described uses polysilicon resistors for temperature-independent resistors 32 and 38 and well resistors for temperature-dependent resistors 34 and 36. Because it is difficult to insure that these resistors are formed into or onto substrate 12 such that they have the exact resistance desired, this embodiment of servo-circuit 30 further includes electrical contacts which allow external elements to be electrically connected to one of the input terminals and to the output terminal of differential amplifier 40. As shown in FIG. 3, an electrical contact 52 is electrically connected to input terminal 42 of differential amplifier 40 at node 3 and electrical contact 54 is electrically connected to output terminal 46 of differential amplifier 40 at node 4. These contacts allow test equipment to be connected to the circuit to determine at what temperature the Wheatstone bridge is in equilibrium, or in other words, at what temperature the voltage between resistor 32 and 34 is the same as the voltage between resistor 36 and 38. This is the temperature at which no output is produced by differential amplifier 40. Once this temperature is determined, adjustments in this temperature at which differential amplifier 40 produces no output may be made by injecting an appropriate externally generated additional current It through node 3. Alternatively, this may be done using terminal 44 of differential amplifier 40. This feature allows the preselected temperature to be adjusted and therefore allows for the correction of any inaccuracies in the resistances of the resistors making up the Wheatstone bridge.

Electrical contacts 52 and 54 may also be used for the additional purpose of providing an electrical feedback circuit for differential amplifier 40. In the embodiment shown in FIG. 3, this feedback circuit takes the form of a resistor R and/or a capacitor C, or other RC networks, connected between electrical contact 52 and 54. As is well known in the art, this RC combination acts to stabilizes the output produced by differential amplifier 40 therefore providing a more precise controlled temperature.

Still referring to FIG. 3, another feature which may be incorporated into the overall arrangement 22 includes providing an additional electrical contact 56 which allows heating arrangement 24 to be either connected to or disconnected from a ground voltage. This feature allows heating arrangement 24 to be disabled in situations where the overall arrangement for maintaining the liquid crystal material at a controlled temperature is not to be used by allowing heating arrangement 24 to be disconnected from the ground voltage thereby causing an open circuit which prevents the flow of any heater current.

Figure 4:
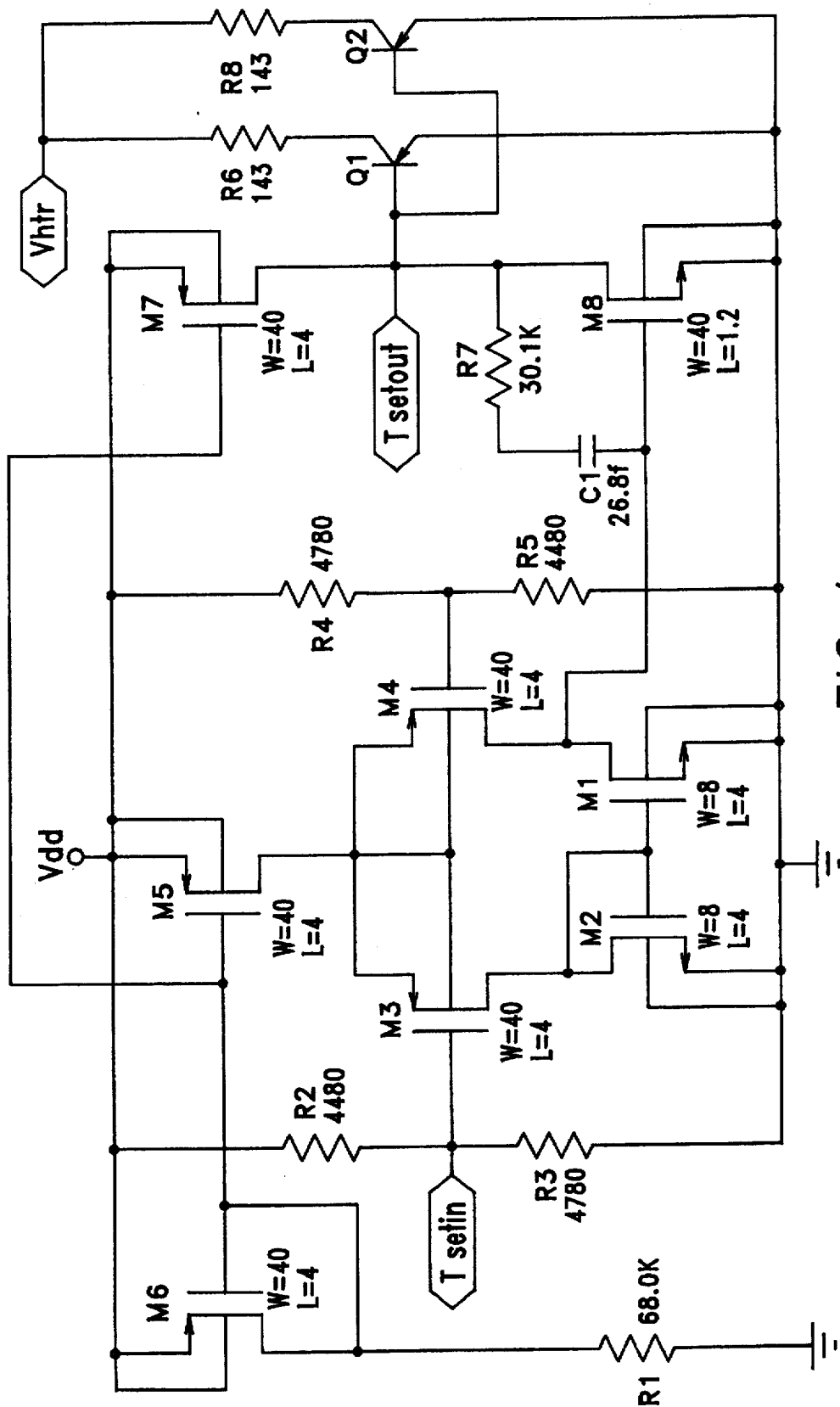
FIG. 4 is a schematic representation of a second embodiment of the integrated circuitry making up the arrangement for maintaining the liquid crystal material at a controlled temperature.

Referring now to FIG. 4, another specific embodiment of a CMOS integrated circuit version of the present invention will be briefly described. In this embodiment, as illustrated in FIG. 4, R2 and R5 play the role of the temperature independent resistors of the Wheatstone bridge, while resistors R3 and R4 are the temperature dependent resistors of the bridge. Transistors Q1 and Q2 together play the role of transistor 48 of the previous examples and the regulate the power dissipated in heater resistors R6 and R8 according to the signal from the differential amplifier made up of the remaining circuit elements. The way in which these latter elements function in the overall circuit shown here will be readily apparent to those with ordinary skill in the art in view of the overall circuit and the present disclosure. It is to be noted that the values shown in FIG. 4 for the various components of this embodiment of the temperature controller differ from the examples described above. These differences exemplify the fact that the scope of the present invention covers a wide range of particular values for the components and is not to be limited by the particular values chosen for purposes of illustration.

Although only a few specific embodiments of the present invention have been described in detail, it should be understood that the present invention may be embodied in many other specific forms without departing from the spirit or scope of the invention. For instance, although the present invention has been described as having all of the elements of the heating arrangement, the sensing arrangement, and the servo-circuit formed as part of the integrated circuit, this is not a requirement of the present invention. Alternatively, the present invention would equally apply so long as at least some of the elements of the heating arrangement, sensing arrangement, or servo-circuit were formed as part of the integrated circuit. Also, although the temperature sensor has been described as taking the form of a Wheatstone bridge having both temperature dependent and temperature independent resistors, other forms of temperature sensing circuitry may be employed while still falling within the scope of the present invention. For example, the forward voltage drop of a pn semiconductor junction is temperature dependent and may be used as the temperature sensor.

Therefore, the present examples are to be considered as illustrative and not restrictive, and the invention is not to be limited to the details given herein, but may be modified within the scope of the appended claims.

What is claimed is:

1. In an active matrix liquid crystal display including a layer of liquid crystal material disposed adjacent a substrate containing integrated circuitry including specific circuitry for controlling the light modulating state of the liquid crystal material, an arrangement for maintaining the liquid crystal material at a controlled temperature above ambient temperature, said arrangement comprising:

(a) means forming part of said integrated circuitry for heating said liquid crystal material sufficient to maintain the liquid crystal material at said controlled temperature, said means heating including a transistor for regulating the amount of power from a source of electrical power dissipated as heat within a heating element, said transistor also being larger than is otherwise necessary for operating said means for heating from an electrical standpoint whereby to more evenly distribute the heat generated by said transistor within said substrate than would otherwise be the case if the transistor were smaller;

(b) means for sensing the temperature at a location in close proximity to said liquid crystal material and producing an output signal representative of said temperature; and (c) a servo-circuit responsive to said output signal for causing said heating means to maintain said liquid crystal material at said controlled temperature.

2. An arrangement according to claim 1 wherein said means for sensing the temperature is integrally formed as part of said integrated circuitry.

3. An arrangement according to claim 2 wherein said means for heating said liquid crystal material is integrally formed as part of said integrated circuitry.

4. An arrangement according to claim 1 wherein said means for heating said liquid crystal material is integrally formed as part of said integrated circuitry.

5. An arrangement according to claim 1 wherein said means for heating said liquid crystal material includes a pattern of polysilicon material formed on said substrate serving as said heating element.

6. An arrangement according to claim 5 wherein said means for sensing the temperature includes circuitry forming a Wheatstone bridge including first and second parallel pairs of first and second series connected resistors and means for applying a voltage across said bridge.

7. An arrangement according to claim 2 wherein said first resistor of said first pair of resistors and said second resistor of said second pair of resistors are substantially temperature-independent resistors having substantially equal resistances which remain relatively constant over a range of temperatures.

8. An arrangement according to claim 7 wherein said second resistor of said first pair of resistors and said first resistor of said second pair of resistors are temperature-dependent resistors whose resistance varies with changes in temperature to a much greater extent than said temperature-independent resistors.

9. An arrangement according to claim 8 wherein said temperature-independent resistors are polysilicon resistors.

10. An arrangement according to claim 8 wherein said temperature-dependent resistors are formed as moderately doped regions in said substrate such as would be formed in the making of wells in a typical CMOS process.

11. An arrangement according to claim 8 wherein said servo-circuit includes a differential amplifier having two input terminals and an output terminal for amplifying said output signal, a first of said input terminals being electrically connected to said first pair of resistors between said first and second resistor making up said first pair of resistors, the second of said input terminals being electrically connected to said second pair of resistors between said first and second resistor making up said second pair of resistors, and the output terminal being electrically connected to said transistor of said means for heating said liquid crystal material.

12. An arrangement according to claim 11 wherein one of said input terminals of said differential amplifier is adapted to be electrically connected to elements external to said servo-circuitry for purposes of controllably adjusting the current applied to said one of said input terminals of said differential amplifier.

13. An arrangement according to claim 12 wherein said output terminal of said differential amplifier is adapted to be electrically connected to elements external to said servo-circuitry for purposes of providing a stabilizing feedback signal to said one of said input terminals of said differential amplifier.

14. An arrangement according to claim 1 further comprising means external of said integrated circuitry for adjusting the value of said controlled temperature.

15. In a liquid crystal display including a layer of liquid crystal material, an arrangement for maintaining the liquid crystal material at a controlled temperature above ambient temperature, said arrangement comprising:

(a) means for heating said liquid crystal material sufficient to maintain the liquid crystal material at said controlled temperature, said heating means including a transistor for regulating the amount of power from a source of electrical power dissipated as heat within a heating element, said transistor also being larger than is otherwise necessary for operating said heating means from an electrical standpoint whereby to more evenly distribute the heat generated by said transistor than would otherwise be the case if the transistor were smaller;

(b) means for sensing the temperature at a location in close proximity to said liquid crystal material and producing an output signal representative of said temperature; and (c) a servo-circuit responsive to said output signal for causing said heating means to maintain said liquid crystal material at said controlled temperature.

16. An arrangement according to claim 15, wherein said means for heating said liquid crystal material is disposed adjacent a substrate containing integrated circuitry including specific circuitry for controlling the light modulating state of the liquid crystal material and wherein said means for heating includes a pattern of polysilicon material formed on said substrate, said pattern of polysilicon material serving as said heating element.

17. In an active matrix liquid crystal display including a layer of liquid crystal material disposed adjacent a substrate containing integrated circuitry including specific circuitry for controlling the light modulating state of the liquid crystal material, a method for maintaining the liquid crystal material at a controlled temperature above ambient temperature, said method comprising the steps of:

(a) providing an arrangement for maintaining the liquid crystal material at a controlled temperature with at least some of the components making up said arrangement being formed as part of said integrated circuitry, said arrangement including, (i) means for heating said liquid crystal material sufficient to maintain the liquid crystal material at said controlled temperature, said heating means including a transistor for regulating the amount of power from a source of electrical power dissipated as heat within a heating element, said transistor also being larger than is otherwise necessary for operating said heating means from an electrical standpoint whereby to more evenly distribute the heat generated by said transistor within said substrate than would otherwise be the case if the transistor were smaller (ii) means for sensing the temperature at a location in close proximity to said liquid crystal material and producing an output signal representative of said temperature, and (iii) a servo-circuit responsive to said output signal for causing said heating means to maintain said liquid crystal material at said controlled temperature;

(b) using said sensing means to sense the temperature at a location in close proximity to said liquid crystal material and produce an output signal representative of said temperature; and (c) using said servo-circuit to cause said heating means to maintain said liquid crystal material at said controlled temperature.

18. A method according to claim 17 wherein all of said components making up said arrangement for maintaining the liquid crystal material at a controlled temperature are formed as part of said integrated circuitry.

19. A method according to claim 17 wherein said means for heating said liquid crystal material includes a pattern of polysilicon material formed on said substrate serving as said heating element.

20. A method according to claim 17 wherein said means for sensing the temperature includes circuitry forming a Wheatstone bridge including first and second parallel pairs of first and second series connected resistors and means for applying a voltage across said bridge.

21. An arrangement according to claim 20 wherein said first resistor of said first pair of resistors and said second resistor of said second pair of resistors are substantially temperature-independent resistors having substantially equal resistances which remain relatively constant over a range of temperatures.

22. A method according to claim 21 wherein said temperature-independent resistors are polysilicon resistors.

23. A method according to claim 20 wherein said second resistor of said first pair of resistors and said first resistor of said second pair of resistors are temperature-dependent resistors whose resistance varies with changes in temperature.

24. A method according to claim 23 wherein said temperature-dependent resistors are formed as moderately doped regions in said substrate such as would be formed in the making of wells in a typical CMOS process.

25. A method according to claim 20 wherein said servo-circuit includes a differential amplifier having two input terminals and an output terminal for amplifying said output signal, a first of said input terminals being electrically connected to said first pair of resistors between said first and second resistor making up said first pair of resistors, the second of said input terminals being electrically connected to said second pair of resistors between said first and second resistor making up said second pair of resistors, and the output terminal being electrically connected to said means for heating said liquid crystal material.

26. In an active matrix liquid crystal display including a layer of liquid crystal material disposed over a substrate containing integrated circuitry, an arrangement for maintaining the liquid crystal material at a controlled temperature above ambient temperature, said arrangement comprising:

(a) means for heating said liquid crystal material sufficient to maintain the liquid crystal material at said controlled temperature, said means for heating said liquid crystal material being integrally formed as part of said integrated circuitry and said means for heating said liquid crystal material including
  (i) a pattern of polysilicon material formed on said substrate serving as a heating element and
  (ii) a transistor for regulating the amount of power from a source of electrical power dissipated as heat within said heating element, said transistor being formed entirely within said substrate below said pattern of polysilicon, said transistor also being larger than is otherwise necessary for operating said heating means from an electrical standpoint whereby to more evenly distribute the heat generated by said transistor within the substrate than would otherwise be the case if the transistor were smaller;

(b) means for sensing the temperature at a location in close proximity to said liquid crystal material and producing an output signal representative of said temperature, said means for sensing the temperature being integrally formed as part of said integrated circuitry and said means for sensing the temperature including circuitry forming a Wheatstone bridge having first and second parallel pairs of first and second series connected resistors and means for applying a voltage across said bridge, said first resistor of said first pair of resistors and said second resistor of said second pair of resistors being substantially temperature-independent resistors having substantially equal resistances which remain relatively constant over a range of temperatures, said second resistor of said first pair of resistors and said first resistor of said second pair of resistors being temperature-dependent resistors whose resistance varies with changes in temperature to a much greater extent than said temperature-independent resistors; and (c) a servo-circuit forming part of said integrated circuitry and responsive to said output signal for causing said heating means to maintain said liquid crystal material at said controlled temperature, said servo-circuit including a differential amplifier having two input terminals and an output terminal for amplifying said output signal, a first of said input terminals being electrically connected to said first pair of resistors between said first and second resistor making up said first pair of resistors, the second of said input terminals being electrically connected to said second pair of resistors between said first and second resistor making up said second pair of resistors, and the output terminal being electrically connected to said transistor of said means for heating said liquid crystal material.

27. An arrangement according to claim 26, wherein one of said input terminals of said differential amplifier is adapted to be electrically connected to elements external to said servo-circuitry for purposes of controllably adjusting the current applied to said one of said input terminals of said differential amplifier.

28. An arrangement according to claim 27 wherein said output terminal of said differential amplifier is adapted to be electrically connected to elements external to said servo-circuitry for purposes of providing a stabilizing feedback signal to said one of said input terminals of said differential amplifier.

29. In an active matrix liquid crystal display including a layer of liquid crystal material disposed over a substrate containing integrated circuitry, a method for maintaining the liquid crystal material at a controlled temperature above ambient temperature, said method comprising the steps of:

(a) providing an arrangement for maintaining the liquid crystal material at a controlled temperature with at least some of the components making up said arrangement being formed as part of said integrated circuitry, said arrangement including,
  (i) means for heating said liquid crystal material sufficient to maintain the liquid crystal material at said controlled temperature,
  (ii) means for sensing the temperature at a location in close proximity to said liquid crystal material and producing an output signal representative of said temperature, said means for sensing the temperature including circuitry forming a Wheatstone bridge having first and second parallel pairs of first and second series connected resistors and means for applying a voltage across said bridge, and
  (iii) a servo-circuit responsive to said output signal for causing said heating means to maintain said liquid crystal material at said controlled temperature, said servo-circuit including a differential amplifier having two input terminals and an output terminal for amplifying said output signal, a first of said input terminals being electrically connected to said first pair of resistors between said first and second resistor making up said first pair of resistors, the second of said input terminals being electrically connected to said second pair of resistors between said first and second resistor making up said second pair of resistors, and the output terminal being electrically connected to said means for heating said liquid crystal material;

(b) using said sensing means to sense the temperature at a location in close proximity to said liquid crystal material and produce an output signal representative of said temperature; and (c) using said servo-circuit to cause said heating means to maintain said liquid crystal material at said controlled temperature.

* * * * *